United States Patent
Salter et al.

(10) Patent No.: US 10,457,201 B2
(45) Date of Patent: *Oct. 29, 2019

(54) BADGE ASSEMBLIES THAT EMANATE VISIBLE IRIDESCENT PATTERNS

(71) Applicant: Ford Global Technologies, LLC, Dearborn, MI (US)

(72) Inventors: Stuart C. Salter, White Lake, MI (US); Paul Kenneth Dellock, Northville, MI (US); James J. Surman, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 296 days.

This patent is subject to a terminal disclaimer.

(21) Appl. No.: 15/358,485

(22) Filed: Nov. 22, 2016

(65) Prior Publication Data

US 2018/0141493 A1  May 24, 2018

(51) Int. Cl.
*B60Q 1/56* (2006.01)
*B60R 13/00* (2006.01)
*G09F 13/00* (2006.01)
*G09F 13/16* (2006.01)
*G09F 13/18* (2006.01)
*G09F 21/04* (2006.01)
*F21S 43/14* (2018.01)
(Continued)

(52) U.S. Cl.
CPC ............. *B60Q 1/56* (2013.01); *B60R 13/005* (2013.01); *F21S 43/14* (2018.01); *F21S 43/241* (2018.01); *F21S 43/245* (2018.01); *F21S 43/249* (2018.01); *F21S 43/26* (2018.01); *F21S 43/315* (2018.01); *F21S 43/40* (2018.01); *G09F 13/005* (2013.01); *G09F 13/16* (2013.01); *G09F 13/18* (2013.01); *G09F 21/04* (2013.01)

(58) Field of Classification Search
CPC . B60Q 1/56; G09F 13/18; G09F 21/04; G09F 13/005; G09F 13/16; G09F 2013/044; G09F 2013/049; G09F 2013/1831; G09F 21/048; B60R 13/005; F21V 23/001; F21V 3/06; F21V 7/00; F21V 23/003; F21V 3/0615; F21V 3/062; F21V 3/0625; F21Y 2115/10; G02B 5/18; G02B 5/1828
See application file for complete search history.

(56) References Cited

U.S. PATENT DOCUMENTS 2,063,207 A   12/1936   Taylor
2,890,627 A    6/1959   Onsken et al.
(Continued)

FOREIGN PATENT DOCUMENTS

CN   200990182 Y   11/2006
CN   103692979 A    4/2014
(Continued)

*Primary Examiner* — Y M. Lee
(74) *Attorney, Agent, or Firm* — Vichit Chea; Price Heneveld LLP (57) ABSTRACT

A badge assembly that includes a translucent, polymeric badge comprising an edge and an interior surface with a diffraction grating having a thickness from 250 nm to 1000 nm and a period from 50 nm to 5 microns; LED sources oriented toward the edge; and fascia configured to obscure the sources. Further, the grating diffracts light from the LED sources through the badge as a visible iridescent pattern.

18 Claims, 5 Drawing Sheets

(51) Int. Cl.
  *F21S 43/20*    (2018.01)
  *F21S 43/241*   (2018.01)
  *F21S 43/245*   (2018.01)
  *F21S 43/249*   (2018.01)
  *F21S 43/31*    (2018.01)
  *F21S 43/40*    (2018.01)

(56) References Cited

U.S. PATENT DOCUMENTS

| | | | |
|---|---|---|---|
| 4,261,031 A | 4/1981 | Fratty | |
| 4,816,968 A | 5/1989 | Yamada et al. | |
| 4,920,460 A | 4/1990 | Mori | |
| 5,034,867 A | 7/1991 | Mayer | |
| 5,612,102 A | 3/1997 | Nakama | |
| 5,703,667 A * | 12/1997 | Ochiai | G02B 6/0038 |
| | | | 362/623 |
| 5,709,453 A | 2/1998 | Krent et al. | |
| 5,724,161 A | 3/1998 | Smith et al. | |
| 5,779,341 A | 7/1998 | Chinniah et al. | |
| 5,871,834 A | 2/1999 | Wang | |
| 6,068,890 A | 5/2000 | Kaumle et al. | |
| 6,285,472 B1 | 9/2001 | Odhner et al. | |
| 6,372,341 B1 | 4/2002 | Jung et al. | |
| D462,032 S | 8/2002 | Schmauz-Grimsel | |
| 6,525,111 B1 | 2/2003 | Spencer et al. | |
| 7,068,434 B2 | 6/2006 | Florczak et al. | |
| 7,976,931 B2 | 7/2011 | Schilling et al. | |
| 7,998,383 B2 | 8/2011 | Lee et al. | |
| 8,033,136 B2 | 10/2011 | Maltezos et al. | |
| 8,258,704 B2 | 9/2012 | Brant | |
| 8,314,989 B1 | 11/2012 | Mossberg et al. | |
| 8,317,379 B2 | 11/2012 | Oomen et al. | |
| 8,619,363 B1 * | 12/2013 | Coleman | G02B 5/18 |
| | | | 362/607 |
| 8,651,720 B2 | 2/2014 | Sherman et al. | |
| 8,834,004 B2 | 9/2014 | Thompson et al. | |
| 9,062,386 B2 | 6/2015 | Reeder | |
| 2001/0040810 A1 | 11/2001 | Kusagaya | |
| 2002/0054434 A1 | 5/2002 | Florczak et al. | |
| 2002/0080622 A1 | 6/2002 | Pashley et al. | |
| 2006/0061153 A1 | 3/2006 | Hamamoto et al. | |
| 2006/0158888 A1 | 7/2006 | Wang | |
| 2009/0050454 A1 * | 2/2009 | Matsukawa | G06F 3/0202 |
| | | | 200/313 |
| 2010/0202154 A1 | 8/2010 | Hamkens | |
| 2011/0037243 A1 | 2/2011 | Laframboise et al. | |
| 2015/0079375 A1 | 3/2015 | Yang et al. | |
| 2015/0371570 A1 * | 12/2015 | Sciackitano | G09F 13/18 |
| | | | 40/544 |
| 2016/0107371 A1 * | 4/2016 | Hurme | B29C 43/222 |
| | | | 264/210.2 |
| 2016/0231493 A1 * | 8/2016 | Lordache | G02B 6/006 |
| 2017/0080784 A1 | 3/2017 | Kobayashi et al. | |
| 2017/0297507 A1 * | 10/2017 | Dellock | B60R 13/005 |
| 2017/0297508 A1 * | 10/2017 | Dellock | B60R 13/005 |

FOREIGN PATENT DOCUMENTS

| | | |
|---|---|---|
| EP | 0870655 A1 | 10/1998 |
| JP | H0572593 U | 10/1993 |
| JP | H10172310 | 6/1998 |
| JP | 2006023567 A | 1/2006 |
| JP | 2010214798 A | 9/2010 |
| JP | 20131545670 A | 8/2013 |
| KR | 101209331 | 11/2012 |
| WO | 9704339 | 2/1997 |
| WO | 9900623 | 7/1999 |

* cited by examiner

BADGE ASSEMBLIES THAT EMANATE VISIBLE IRIDESCENT PATTERNS

FIELD OF THE INVENTION

The present invention generally relates to badges, trim and other similar assemblies for vehicles and other structures that emanate visible iridescent patterns, particularly automotive badges with a jewel-like appearance in day- and night-time conditions.

BACKGROUND OF THE INVENTION

Car enthusiasts and owners of high-end vehicles are continually demanding new aesthetics that justify, at least in part, the high cost of such vehicles. Owners of mid-range and economy-level vehicles also can appreciate interesting design aesthetics visible in both day- and night-time environments, even if the inclusion of these aesthetics adds some marginal cost to a vehicle. In view of these needs, vehicle badges can be designed to reflect the high-end nature of particular vehicle models. For example, certain vehicle models can be more desirable to car enthusiasts and owners with a badge having a jewel-like appearance. Similarly, vehicle badges that emanate interesting sparkling patterns can also be configured to satisfy certain design aspects of particular mid-range or economy-level vehicle models.

The direct incorporation of jewels and/or precious metals into a vehicle badge can satisfy these needs in some respects. These elements might be encapsulated within a translucent badge for a luxurious or otherwise interesting design aesthetic. Nevertheless, merely adding jewels and precious metals to conventional badges will significantly increase the cost of the badge, and all but the most cost-insensitive car enthusiasts will likely object to the significant added cost of these materials. In addition, the inclusion of jewels and/or precious metals into a vehicular badge increases the likelihood that they will be removed by thieves as a target of relative opportunity. Further, the inclusion of jewels and/or precious metals into a badge might reduce the lifetime of the badge by virtue of dissimilarities in the material properties of the jewels and/or precious metals and primary materials of the badge.

Other approaches to upgrading the aesthetics of vehicle badges have focused on mimicking the look of diamonds and jewels within a molded plastic part. For example, it is feasible to make faceted, plastic badges that attempt to approximate the look of actual diamonds and jewels. Unfortunately, the results of such approaches are not promising. Generally, such badges appear to look like costume jewelry and, arguably, could detract from the overall aesthetic of a high-end, a mid-level and/or an economy vehicle rather than enhance it.

Accordingly, there is a need for badges, trim and other similar assemblies (and methods of making them) that emanate visible iridescent patterns and/or exhibit a jewel-like appearance in both day-time and night-time conditions, without a significant cost increase associated with the enhancement. In addition, these iridescent badge assemblies should maintain their appearance over a vehicle lifetime while being exposed to a typical vehicular environment. Further, these badges should be amenable to low-cost manufacturing approaches given their usage in vehicular applications as an end product with an expected large manufacturing volume.

SUMMARY OF THE INVENTION

According to one aspect of the present invention, a badge assembly is provided that includes a translucent, polymeric badge comprising an edge and a diffraction grating having a thickness from 250 nm to 1000 nm and a period from 50 nm to 5 microns. The vehicular badge also includes light-emitting diode (LED) sources oriented toward the edge. Further, the grating diffracts light from the LED sources through the badge as a visible iridescent pattern.

According to another aspect of the present invention, a badge assembly is provided that includes a translucent, polymeric badge comprising an edge and a film on an interior surface; and LED sources oriented toward the edge. Further, the film comprises a diffraction grating having a thickness from 250 nm to 1000 nm and a period from 50 nm to 5 microns that diffracts light from the LED sources through the badge as a visible iridescent pattern.

According to a further aspect of the invention, a badge assembly is provided that includes a translucent, polymeric badge comprising an edge and an interior surface with a diffraction grating having a thickness from 250 nm to 1000 nm and a period from 50 nm to 5 microns; LED sources oriented toward the edge; and fascia configured to obscure the sources. Further, the grating diffracts light from the LED sources through the badge as a visible iridescent pattern.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
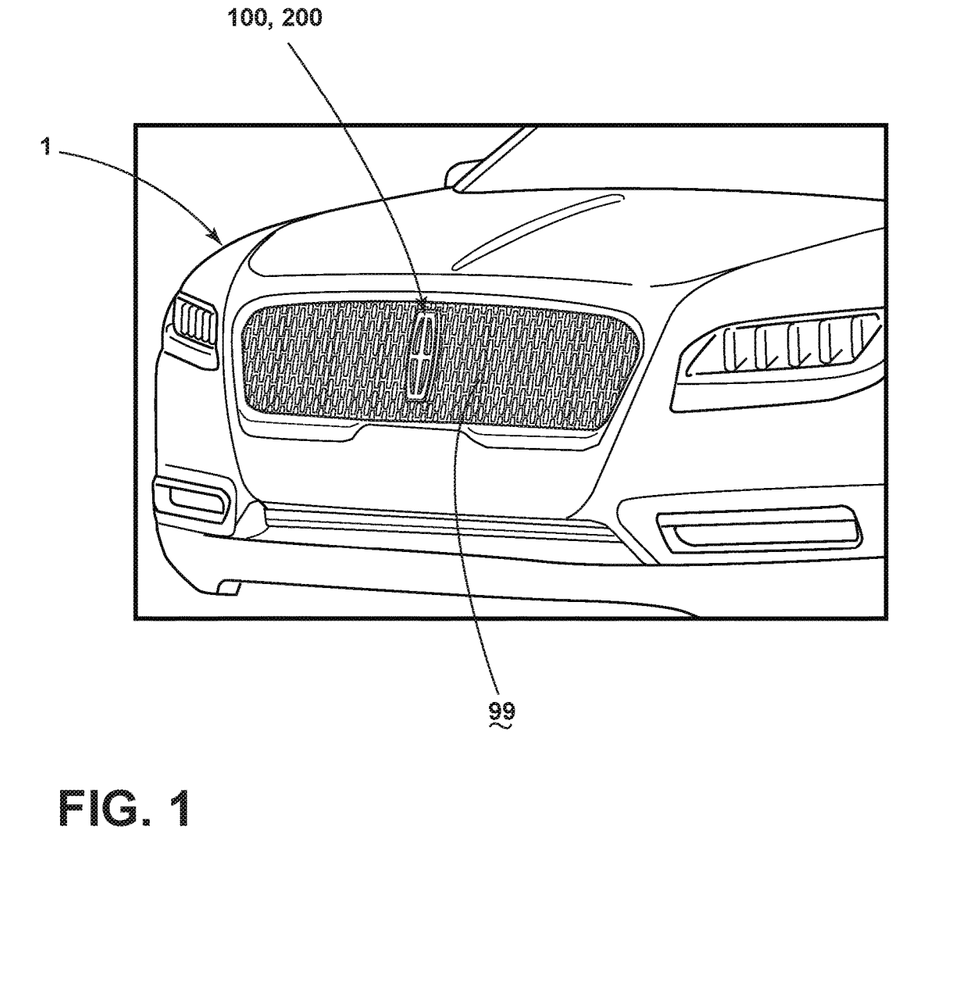
FIG. 1 is a front perspective view of an iridescent badge assembly affixed to the front of a vehicle according to an aspect of the disclosure.
Figure 3A:
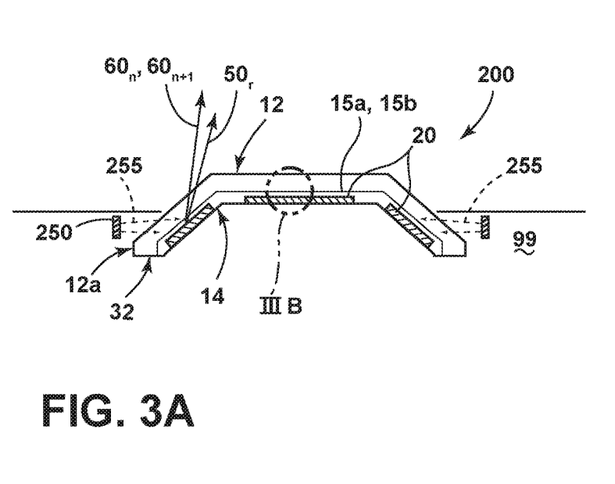
FIG. 3A is a cross-sectional, schematic view of the badge assembly depicted in FIG. 3 through line IIIA-IIIA.
Figure 4:
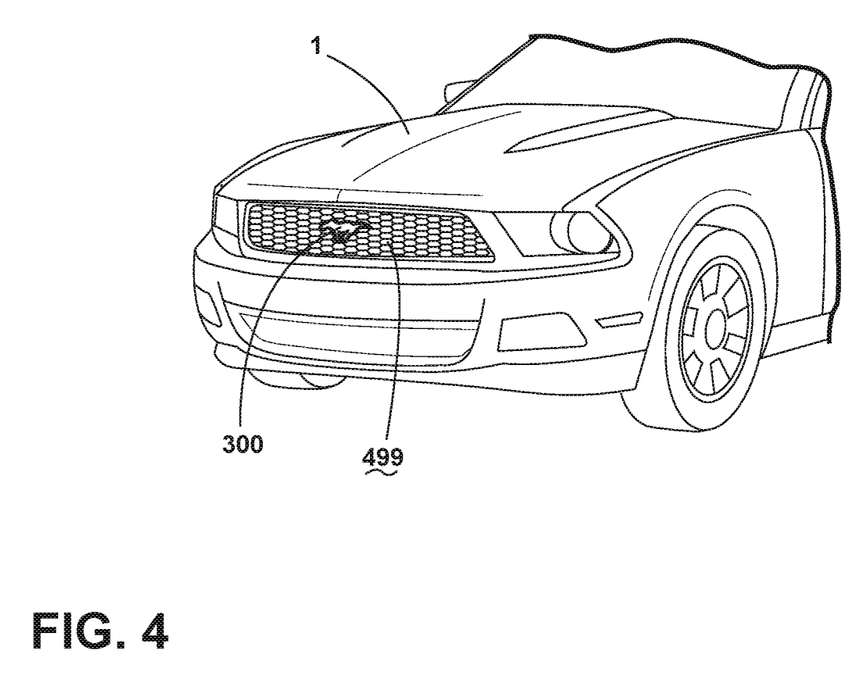
FIG. 4 is a front perspective view of an iridescent badge assembly affixed to the front of a vehicle according to an aspect of the disclosure.

For purposes of description herein, the terms "upper," "lower," "right," "left," "rear," "front," "vertical," "horizontal," "interior," "exterior," "vehicle forward," "vehicle rearward" and derivatives thereof shall relate to the invention as oriented in FIGS. 1 and 4. Further, for purposes of description herein, the terms "interior," "exterior," "top," "bottom," "upper," "lower" and derivatives thereof shall relate to the invention as oriented in FIGS. 2A, 3A and 5A. However, the invention may assume various alternative orientations, except where expressly specified to the contrary. Also, the specific devices and assemblies illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Described in this disclosure are iridescent badge assemblies, trim assemblies and other exterior surface assemblies (collectively, "iridescent badge assemblies") for vehicles (e.g., automobiles, watercraft, motorcycles, etc.) and other structures (e.g., architectural elements). The iridescent badge assemblies contain one or more diffraction gratings that are integral with the main body of the assemblies (e.g., a badge, a badge member, etc.) and one or more light-emitting diode (LED) sources that are oriented toward the edge(s) of the main body. Further, the diffraction gratings can be part of films that are joined, bonded, molded or otherwise incorporated into the badge member or main body of the badge assembly. More generally, each of the diffraction grating(s) of these badge assemblies provides sparkle and iridescence to the element upon irradiation with ambient and LED light sources. That is, the iridescent assemblies can produce visible iridescent patterns upon irradiation with ambient light under day-time conditions. Further, the iridescent assemblies can produce other visible iridescent patterns upon irradiation with the LED source(s) that are part of these assemblies.

It is also evident that various microscopic features can be added or adjusted within the diffraction gratings to achieve varied aesthetic effects in the iridescent badge assemblies of the disclosure. Gratings can also be incorporated into various regions within the iridescent badge assembly to achieve other varied, aesthetic effects. These gratings can also be embossed into films that are later incorporated into the badge member. Further, these iridescent badges, trim and other iridescent assemblies can be injection molded as one part, and typically cost only marginally more than conventional badges and trim. In addition, these badges, trim and other related vehicular elements can be insert molded from two or more parts (e.g., a badge member and a diffraction film), with or without vacuum assistance, with process costs that are only marginally higher than the process costs for conventional badges and trim.

Referring to FIG. 1, a front perspective view of an iridescent vehicular badge assembly 100, 200 affixed to the front of a vehicle 1 is provided according to an aspect of the disclosure. As depicted, the badge assembly 100, 200 is characterized by an iridescent or jewel-like appearance under ambient lighting (e.g., from the sun) and lighting from the LED sources (e.g., LED sources 150, 250 shown in FIGS. 2 and 3) associated with each of the assemblies 100, 200. One or more diffraction gratings 20 (see FIGS. 2B and 3B) configured within, or as part of a film that includes, an interior surface of the badge assembly 100, 200 provide the iridescent or jewel-like appearance.

As also shown in FIG. 1, a grille 99 is depicted adjacent, or otherwise in close proximity, to the badge assembly 100, 200. In some embodiments, the grille 99 and the badge assembly 100, 200 can be configured such that the grille 99 obscures the LED source or sources 150, 250 (see FIGS. 2B and 3B) that are part of the badge assembly. It should also be understood that fascia and other similar exterior features as the grille 99 can serve the same function for iridescent badge assemblies, configured according to the disclosure, employed in other applications, such as on other exterior surfaces of a vehicle, watercraft, architectural elements, etc.

Figure 2:
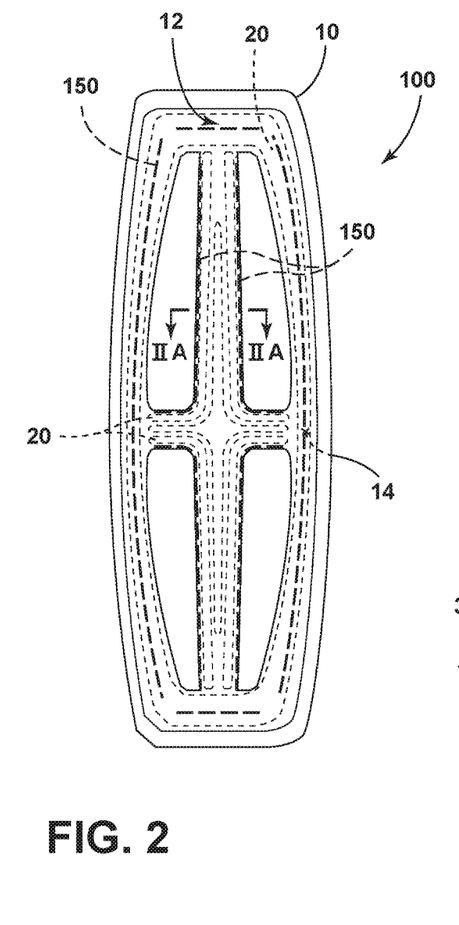
FIG. 2 is a top-down, schematic plan view of an iridescent badge assembly with obscured LED sources according to an aspect of the disclosure.

As shown in FIG. 2, an iridescent vehicular badge assembly 100 can include a translucent, polymeric badge member 10. The badge member 10 includes one or more exterior surfaces 12 and one or more interior surfaces 14. In some aspects, the badge member 10 is characterized by an optical transmissivity of 85% or more over the visible spectrum (e.g., 390 to 700 nm). Preferably, the badge member 10 is characterized by an optical transmissivity of 90% or more, and even more preferably, 95% or more, over the visible spectrum. Further, the badge member 10 can be optically clear with no substantial coloration. In other embodiments, the badge member 10 can be tinted (e.g., with one or more colors, smoke-like effects, or other gradations and intentional non-uniformities) and/or affixed with one or more filters on its exterior surfaces 12 and/or interior surfaces 14 to obtain a desired hue (e.g., blue, red, green, etc.) or other effect.

Referring again to FIG. 2, the badge member 10 of the iridescent vehicular badge assembly 100 is fabricated from a polymeric material. These polymeric materials include thermoplastic and thermosetting polymeric materials, e.g., silicones, acrylics and polycarbonates. In some embodiments, the precursor material(s) employed to fabricate the badge member 10 are selected to have a high flow rate and/or a low viscosity during a molding process such as injection molding. In other embodiments, the precursor material(s) employed to fabricate the badge member 10 are selected with higher viscosity levels based on cost or other considerations when a less viscosity-dependent process is employed, such as insert molding. According to another embodiment, ultraviolet light-resistant materials and/or treatments are employed in the badge member to enhance its resistance to ambient light-related degradation. In certain aspects, fillers (not shown), e.g., glass beads, glass particles, and other similar filler elements can be added to a polymeric material, serving as a matrix, to form the badge member 10 without significant detriment to the optical properties of the member. These fillers can provide added durability and/or additional aesthetic effects to the iridescent vehicular badge assembly 100. Preferably, glass fillers and the like are added in the range of 1 to 15% by volume, 3 to 10% by volume, or other values therebetween, depending on the nature of the filler and the desired effect (e.g., enhanced durability, added light scattering, etc.).

Figure 2A:
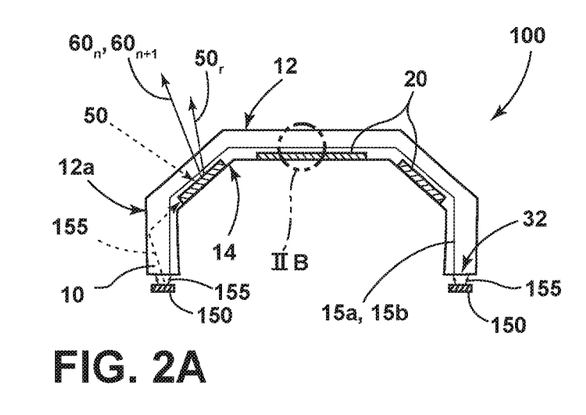
FIG. 2A is a cross-sectional, schematic view of the badge assembly depicted in FIG. 2 through line IIA-IIA.

The badge member 10 of the iridescent vehicular badge assembly 100 can take on any of a variety of shapes, depending on the nature of the badge, vehicle insignia and other design considerations. For example, in some embodiments, one or more of the exterior and interior surfaces 12, 14 of the badge member 10 are planar (e.g., faceted), non-planar, curved or characterized by other shapes. As also understood by those with ordinary skill in the field, the exterior and interior surfaces 12, 14 can be characterized with portions having planar features and portions having non-planar features. As shown in FIGS. 2 and 2A, for example, the badge member 10 has planar (e.g., faceted) exterior and interior surfaces 12, 14. Further, the interior surfaces 14 of the badge member comprise one or more diffraction gratings 20, as viewed in a cross-section.

Still referring to FIG. 2, the badge member 10 of the iridescent vehicular badge assembly 100 can consist of a single component in a preferred embodiment. For example, the badge member 10 can be formed as a single piece with integral diffraction grating(s) 20 from a single mold. In such configurations, the diffraction grating(s) 20 are located within a diffraction region 15a (see FIG. 2A) in contact with, or in proximity to, the interior surface 14 of the badge assembly 100. In other aspects, the badge member 10 can be formed from multiple parts, preferably with the parts joined (e.g., as with an optical adhesive, through an insert-molding process, etc.), without significant detriment to the overall optical properties of the member 10. For example, in some of these embodiments, the iridescent vehicular badge assembly 100 includes a badge member 10 and one or more diffraction films 15b (see FIG. 2A) having an exterior surface in common with the interior surface 14 of the badge assembly 100.

Referring now to FIG. 2A, exterior and interior surfaces 12, 14 of the badge member 10 of the iridescent vehicular badge assembly 100 are depicted. As shown, the interior surface 14 includes one or more diffraction gratings 20, integral with the badge member 10 in a diffraction region 15a or within a diffraction film 15b. As depicted in exemplary fashion in FIG. 2A, the iridescent vehicular badge assembly 100 includes a badge member 10 with a plurality of diffraction gratings 20 on planar portions of the interior surfaces 14. Some aspects of the vehicular badge assembly 100 include a badge member 10 with one or more diffraction gratings 20 on one or more planar portions of the interior surface 14. In other aspects of the badge assembly 100, one or more diffraction gratings 20 are located on or in proximity to non-planar regions of the interior surface 14. In another implementation of the vehicular badge assembly 100, one or more diffraction gratings 20 are located within the thickness of the badge member 10 in relative proximity to the interior surface 14, and close enough to the interior surface 14 such that incident light 155 from the LED sources 150 can reach the top-side of the gratings 20 (see also FIG. 2B).

In addition, as depicted in FIG. 2A, the interior surface 14 of the badge member 10 of the iridescent vehicular badge assembly 100 can include one or more diffraction regions 15a or diffraction films 15b, each of which contains one or more diffraction gratings 20. The diffraction region 15a is loosely defined as a layer within the badge member 10 without appreciable boundaries that contains one or more diffraction gratings 20. Similarly, the diffraction film 15b may be in the form of a layer, foil, film or comparable structure that is joined or otherwise fabricated to be integral with the badge member 10 and contains one or more diffraction gratings 20. In addition, the diffraction regions and films 15a, 15b may be from about 0.1 mm to about 1 cm in thickness. Preferably, the diffraction regions and films 15a, 15b are between about 0.1 mm and 5 mm in thickness. It is also preferable that any interfaces between the badge member 10 and the diffraction regions and films 15a, 15b are not conducive to significant light reflection or refraction, as excessive light reflection and/or refraction at these interfaces could reduce the efficiency of the diffraction gratings 20 in producing visible iridescent patterns from ambient light 50 and incident light 155 from the LED sources 150. Further, as also depicted in FIG. 2A, the diffraction regions and films 15a, 15b can comprise diffraction gratings 20 located on planar and/or non-planar portions of the interior surfaces 14.

Referring again to FIG. 2A, the iridescent badge assembly 100 is shown as including one or more LED sources 150. In some embodiments, the LED sources 150 are located such that they are oriented toward edges of the badge member 10. As shown in exemplary form in FIG. 2A, the LED sources 150 are oriented toward the bottom edges 32 of the badge member 10 such that incident light 155 from the sources 150 enters the badge member 10 at these locations. In some implementations, the LED sources 150 are placed in direct contact with the edges 32. Other implementations of the iridescent vehicular badge assembly 100 can employ LED sources 150 that are in proximity to, but spaced from, the edges 32. In such configurations, the spacing generally ranges from about 1 mm to about 100 mm, from about 5 mm to about 75 mm, or other spacing values within these ranges, depending on the size and power level of the LED sources 150, geometry of the badge member 10, location of the diffraction gratings 20, and other considerations.

Further, in a preferred embodiment of the iridescent vehicular badge assembly 100 depicted in FIG. 2A, the LED sources 150 are located in proximity to edges 32 of the badge member 10 such that the badge member 10 itself serves to obscure the sources 150 from view (e.g., from a vantage point above the exterior surface 12 of the badge member 10) (see FIGS. 2 and 2A). Preferably, the LED sources 150 are oriented in relation to the badge member 10, and particularly its interior surfaces 14, such that a substantial portion (e.g., >60%) of the incident light 155 from the sources 150 enters the badge member 10 and directly irradiates the diffraction gratings 20. In some aspects of the iridescent vehicular badge assembly 100, one or more interior portions 12a of the exterior surface 12 can be coated with an optically reflective material to ensure that a substantial portion of the incident light 155 from the LED sources 150 within the badge member 10 is internally reflected within the badge member 10 toward its diffraction gratings 20 or otherwise directly impinges on the gratings 20. For example, interior portions 12a can be configured with a highly specular, mirror-like coating, such as a metal-containing mirror like film. In another embodiment, the interior portions 12a can comprise a non-specular, reflective coating, such as a white matte paint.

Figure 2B:
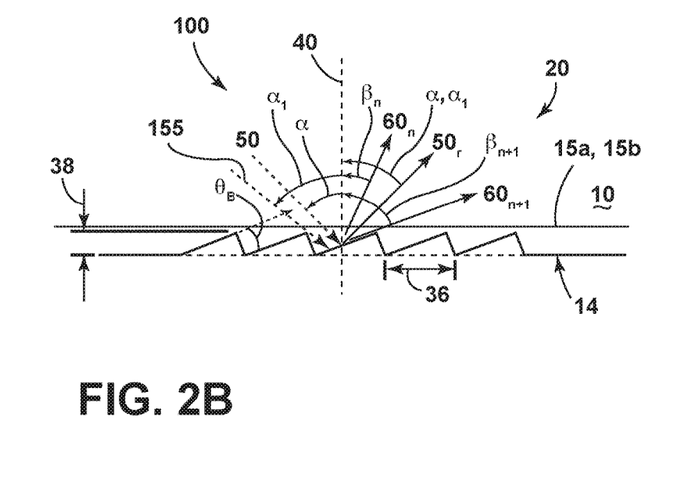
FIG. 2B is an enlarged, cross-sectional schematic view of a diffraction grating incorporated into an interior surface of the badge assembly depicted in FIG. 2.

Referring again to the iridescent vehicular badge assembly 100 depicted in FIGS. 2-2B, one or more LED sources 150 can be oriented toward the edges (e.g., edges 32) of the badge member 10 such that incident light 155 from these sources enters the badge member 10 and is diffracted by the diffraction grating or gratings 20. Various types of LEDs are suitable for use as the LED sources 150 including but not limited to top-emitting LEDs, side-emitting LEDs, and others. According to some aspects, additional optics (not shown) can be placed between the LED sources 150 and the edges of the badge member 10 to adjust, collimate, focus or otherwise shape the incident light 155 that enters the badge member from these sources. In other aspects of the badge assembly, additional optics (not shown), e.g., reflectors, can be placed in proximity to the LED sources 150 and the edges of the badge member 10 to increase the portion of the incident light 155 that enters the badge member from the LED sources.

As shown schematically in FIG. 2B in cross-sectional form, the diffraction gratings 20 of the badge member 10 of an iridescent vehicular badge assembly 100 (see FIG. 2) are formed at a microscopic level. In an embodiment, the diffraction gratings 20 have a thickness 38 that ranges from 250 nm to 1000 nm. The thickness 38 of the diffraction gratings 20, for example, should be maintained in the range of 250 nm to 1000 nm to ensure that the iridescent vehicular badge assembly 100 (see FIGS. 2 and 2A) exhibits a jewel-like appearance through light diffraction upon direct illumination from ambient light rays 50 and incident light 155 (e.g., as from the LED sources 150) while also having a minimal effect on the optical clarity of the badge assembly 100 under non-direct ambient lighting. Preferably, the thickness 38 of the diffraction gratings 20 ranges from about 390 nm to about 700 nm. In other embodiments, the thickness 38 of the diffraction gratings 20 ranges from 500 nm to 750 nm. Further, in some embodiments, crushed, reflective crystals (e.g., crushed silicate glass powder) are added to the diffraction gratings 20 to enhance or otherwise modify the jewel-like appearance produced by the light that interacts with the gratings 20. Preferably, the crushed, reflective crystals are added to the diffraction gratings 20 when incorporated into diffraction regions and films 15a, 15b (see FIG. 2A).

As also shown schematically in FIG. 2B, the grooves of the diffraction gratings 20 within the badge member 10 of an iridescent vehicular badge assembly 100 can be configured in various shapes to diffract incident light and produce an iridescent and jewel-like appearance. As depicted in FIG. 2B in exemplary form, the gratings 20 have a sawtooth or triangular shape. In three dimensions, these gratings 20 can appear with a stepped or sawtooth shape without angular features (i.e., in the direction normal to what is depicted in FIG. 2B), pyramidal in shape, or some combination of stepped and pyramidal shapes. Other shapes of the diffraction gratings 20 include hill-shaped features (not shown)—e.g., stepped features with one or more curved features. The diffraction gratings 20 can also include portions with a combination of triangular and hill-shaped features. More generally, the shapes of the gratings 20 should be such that an effective blazing angle $\theta_B$ of at least 15 degrees is present for one or more portions of each grating, tooth or groove of the diffraction gratings 20. The blaze angle $\theta_B$ is the angle between step normal (i.e., the direction normal to each step or tooth of the grating 20) and the direction normal 40 to the interior surface 14 having the grating 20.

Generally, the blaze angle $\theta_B$ is optimized to maximize the efficiency of the wavelength(s) of the incident light 155 (e.g., as from the LED sources 150 during night-time conditions) and/or ambient light 50 (e.g., as from sunlight during day-time conditions) impinging on the diffraction gratings 20, to ensure that maximum optical power is concentrated in one or more diffraction orders while minimizing residual power in other orders (e.g., the zeroth order indicative of the ambient light itself). An advantage of situating diffraction gratings 20 (see FIG. 2A) on planar portions or aspects of the interior surfaces 14 is that a constant blaze angle $\theta_B$ and period 36 will result in consistent reflected and diffracted light produced from the diffraction grating. Such consistency can be employed by a designer of the iridescent vehicular badge assembly 100 (see FIG. 2) to ensure that particular jewel-like effects (e.g., multiple, visible iridescent patterns) are observable by individuals at different locations and distances from the badge assembly 100 upon irradiation of the diffraction gratings 20 by ambient light 50 and incident light 155 from the LED sources 150.

As also shown schematically in FIG. 2B, the diffraction gratings 20 of the badge member 10 of an iridescent vehicular badge assembly 100 are characterized by one or more periods 36 (also known as d in the standard nomenclature of diffraction gratings). In most aspects of the vehicular badge assembly 100 (see FIG. 2), the period 36 of the diffraction grating 20 is maintained between about 50 nm and about 5 microns. In general, the maximum wavelength that a given diffraction grating 20 can diffract is equal to twice the period 36. Hence, a diffraction grating 20 with a period 36 that is maintained between about 50 nm and about 5 microns can diffract light in an optical range of 100 nm to about 10 microns. In a preferred embodiment, the period 36 of a diffraction grating 20 is maintained from about 150 nm to about 400 nm, ensuring that the grating 20 can efficiently diffract light in an optical range of about 300 nm to about 800 nm upon irradiation from ambient light 50 and incident light 155 from the LED sources 150, roughly covering the visible spectrum.

Referring again to FIG. 2B, a diffraction grating 20 along a portion of an interior surface 14 of a badge member 10 is depicted in exemplary form. Ambient light 50 (typically ambient, sun light) at an incident angle $\alpha$ or incident light 155 (e.g., from LED sources 150) at an incident angle $\alpha_1$ is directed against a sawtooth-shaped diffraction grating 20 having a thickness 38, a period 36 and a blaze angle $\theta_B$. More particularly, a portion of the ambient light 50 or incident light 155 (preferably, a small portion) striking the grating 20 at an incident angle $\alpha$, $\alpha_1$ is reflected as reflected light $50_r$ at the same angle $\alpha$, $\alpha_1$ and the remaining portion of the ambient light 50 or incident light 155 is diffracted at particular wavelengths corresponding to diffracted light $60_n$, $60_{n+1}$, etc. at corresponding diffraction angles $\beta_n$, $\beta_{n+1}$, etc. The reflected light $50_r$ is indicative of the zeroth order (i.e., n=0) and the diffracted light $60_n$, $60_{n+1}$, etc., are indicative of the nth order diffraction according to standard diffraction grating terminology, where n is an integer corresponding to particular wavelengths of the reflected or diffracted light. Ultimately, the reflected light $50_r$ and diffracted light $60_n$, $60_{n+1}$, etc. collectively produce various visible, iridescent patterns that exit the iridescent vehicular badge assembly 100. In some aspects, the reflected and diffracted light from irradiation of the diffraction gratings 20 by ambient light 50 can produce a first visible, iridescent pattern; and the reflected and diffracted light from irradiation of the diffraction gratings 20 by incident light 155 from the LED sources 150 can produce a second visible, iridescent pattern. According to another embodiment of the badge assembly 100, these visible, iridescent patterns can vary as the intensity, direction and power of the ambient light 50 and/or incident light 155 striking or otherwise irradiating the diffraction gratings 20 changes over time.

Referring again to the iridescent vehicular badge assembly 100, the diffraction gratings 20, such as depicted in an enlarged, schematic format in FIG. 2B, are advantageously located within the badge member 10 (see FIGS. 2, 2A and 2B). In particular, the diffraction gratings 20 are generally protected from damage, alteration and/or wear due to their general location on the backside of the badge member 10, situated on or in proximity to the interior surfaces 14. Given that ambient light 50 and incident light 155 must pass through the member 10 to reach the grating 20 and that reflected light $50_r$ and diffracted light $60_n$, $60_{n+1}$, etc., must also pass through the member 10 to produce visible iridescent patterns, the diffraction efficiency of a diffraction grating 20 can be affected by the thickness of the badge member 10 due to its absorptive effects. Accordingly, it can be preferable to employ a badge member 10 with high optical clarity. In some aspects, for example, the optical transmissivity of the badge member can exceed 75% in the visible spectrum. In other aspects, the optical transmissivity of the badge member 10 can exceed 80%, 85%, 90%, 95%, or other transmissivity levels between these values. According to other aspects, the fact that ambient light 50 and/or incident light 155 must pass through the badge member 10 prior to reaching the diffraction gratings 20, facilitates the development of additional visual effects through tinting, shading, and other adjustments to the structure within the badge member 10. For example, glass fillers and particles can be added to the badge member 10, in some aspects, to intentionally alter the visible iridescent patterns produced by the iridescent vehicular badge assembly 100.

Figure 3:
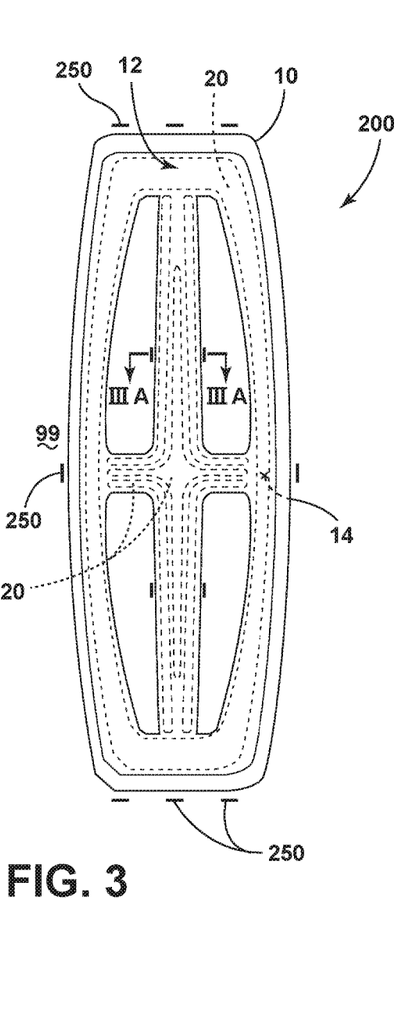
FIG. 3 is a top-down, schematic plan view of an iridescent badge assembly with LED sources obscured by fascia according to an aspect of the disclosure.
Figure 3B:
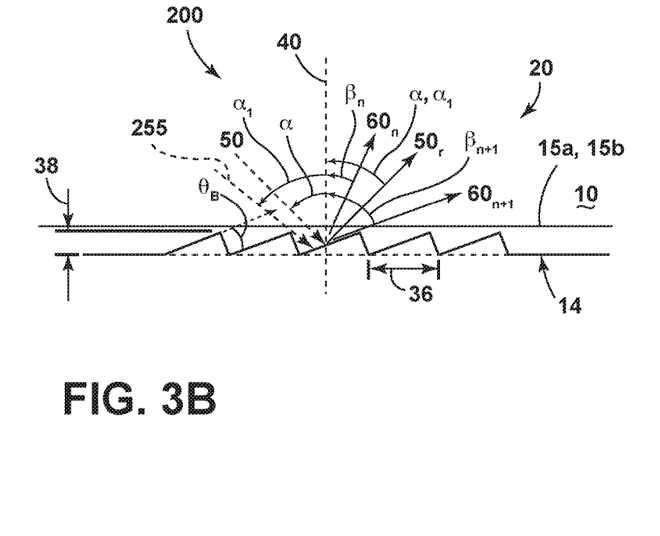
FIG. 3B is an enlarged, cross-sectional schematic view of a diffraction grating incorporated into an interior surface of the badge assembly depicted in FIG. 3.

Referring now to FIGS. 1 and 3-3B, an iridescent vehicular badge assembly 200 is shown in exemplary form. The badge assembly 200 is similar to the iridescent vehicular badge assembly 100 shown in FIGS. 1 and 2-2B and like-numbered elements have the same or similar functions and structure. A principal difference between the badge assembly 200 and the assembly 100 is that the former assembly includes one or more LED sources 250 that produce incident light 255 and are oriented toward the edges 32 of the badge member 10, but are not otherwise obscured by the badge member 10 itself. That is, the LED sources 250, as shown in FIGS. 3 and 3A, are located outboard of the badge member 10 such that the badge member 10 does not itself obscure the sources 250 from view. Other than their respective differences in location and orientation, the LED sources 150, 250 and incident light 155, 255 are similar or otherwise identical to one another as configured to operate within the badge assemblies 100, 200.

Notwithstanding the location of the LED sources 250 outboard of the badge member 10, the iridescent vehicular badge assembly 200 also includes a grille 99, which functions to obscure the sources 250 from view (e.g., from a vantage point above the exterior surface 12 of the badge member 10). That is, the grille 99 (see FIGS. 1 and 3A) is situated in relation to the badge member 10 and the LED sources 250 to obscure the sources from view. In some aspects, the grille 99 (or comparable fascia element) can be situated in direct contact with the exterior surface 12 of the badge member 10. In other aspects, the grille 99 (or comparable fascia element) is situated in close proximity to the exterior surface 12 of the badge member 10, at a location sufficient to obscure the LED sources 250 from view. Accordingly, an advantage of the iridescent vehicular badge assembly 200 is that the grille 99 or fascia offers significant design flexibility in the portion of the badge member 10 obscured from view. For example, in some implementations, the portion of the badge assembly 200 beneath the grille 99 is flared outward to maximize the portion of the incident light 255 from the sources 250 that reaches the diffraction gratings 20.

Figure 5:
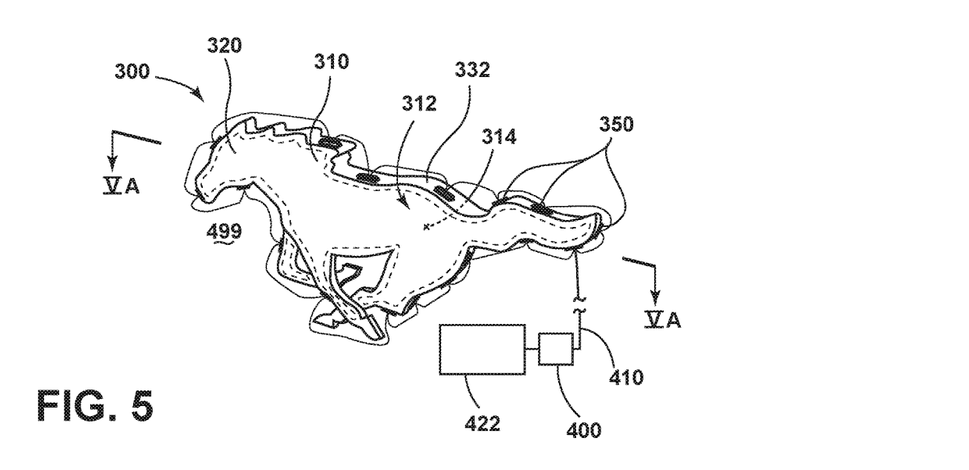
FIG. 5 is a top-down, schematic plan view of an iridescent badge assembly with edge-mounted LED sources obscured by fascia and coupled to a controller according to an aspect of the disclosure.
Figure 5A:
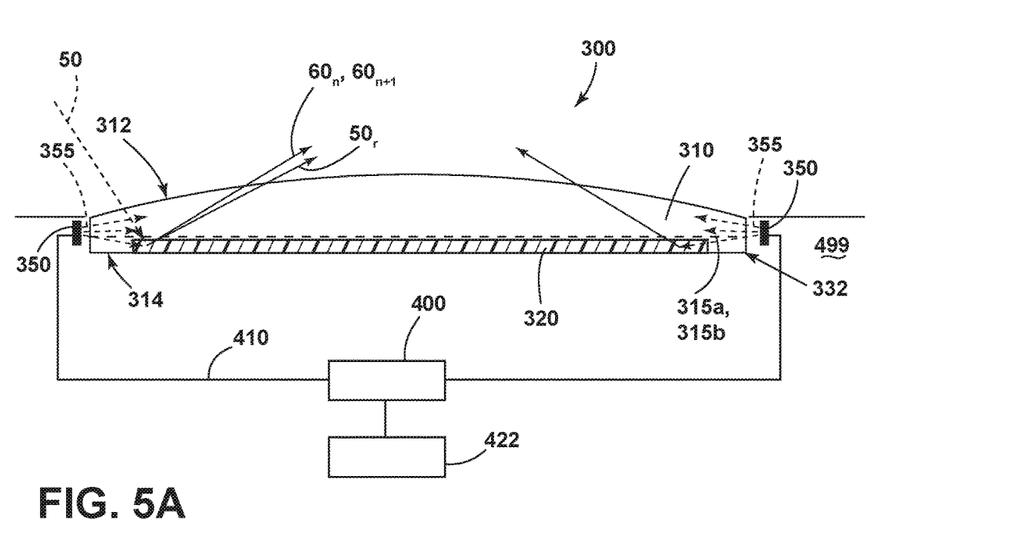
FIG. 5A is a cross-sectional, schematic view of the badge assembly depicted in FIG. 5 through line VA-VA.

Turning now to FIG. 4, an iridescent vehicular badge assembly 300 is affixed to the front of a vehicle 1 with a grille 499 according to another aspect of the disclosure. The badge assembly 300, as shown in greater detail in FIGS. 5 and 5A, is similar to the iridescent vehicular badge assembly 100, 200 shown in FIGS. 1-3B and like-numbered (and like-named) elements have the same or similar functions and structure as described earlier in the disclosure. Principal differences between the badge assembly 300 and the badge assembly 100, 200 is that the former assembly is depicted with a different shape factor (e.g., a continuous "pony" or "mustang" shape), and is shown with features for controlling the production of visible, iridescent patterns from the irradiation of diffraction gratings with incident light from LED sources.

As shown in FIG. 5, the iridescent vehicular badge assembly 300 includes a translucent, polymeric badge member 310. The badge member 310 includes one or more edges 332, an interior surface 314 and an exterior surface 312. Still further, the interior surface 314 includes one or more diffraction gratings 320, as situated within diffraction region 315a or film 315b. According to an embodiment, the diffraction grating or gratings 320 have a thickness from 250 nm to 1000 nm and a period from 50 nm to 5 microns. Further, the badge assembly 300 includes one or more LED sources 350 that are oriented toward the edge or edges 332 such that incident light 355 (see FIG. 5A) from the sources 350 enters the badge member 310. Still further, the badge assembly 300 includes a grille 499 (or comparable fascia element) that is configured to obscure the LED sources 350 from view (see FIG. 5A).

Referring now to FIG. 5A, an embodiment of the iridescent vehicular badge assembly 300 can be configured to produce one or more visible, iridescent patterns. For example, ambient light 50 can enter the badge member 310 of the assembly 300 and then strike the one or more diffraction gratings 320. At this point, the reflected light $50_r$ and diffracted light $60_n$, $60_{n+1}$ from the diffraction grating 320 can form a visible, iridescent pattern that emanates from the badge assembly 300. Similarly, incident light 355 from the LED sources 350 can enter the badge member 310 of the assembly 300 (e.g., at the edges 332) and then strike the one or more diffraction gratings 320. The resulting reflected light $50_r$ and diffracted light $60_n$, $60_{n+1}$ from the diffraction grating 320 can collectively form another visible, iridescent pattern that emanates from the badge assembly 300.

As also depicted in FIGS. 5, 5A, the iridescent vehicular badge assembly 300 can be configured with a controller 400 that is coupled to the one or more LED sources 350. In some embodiments, the LED sources 350 are coupled to the controller 400 by wiring 410. In other embodiments, the LED sources 350 can be coupled to the controller 400 by a wireless communication protocol, such as a BLUETOOTH® protocol or other wireless protocol as understood by those with ordinary skill in the field of the disclosure. Further, the controller 400 can be coupled to a power source 422, which functions to power the controller 400. In some embodiments, the power source 422 can also power the LED sources 350 via the wiring 410. In other embodiments in which the LED sources 350 are coupled to the controller 400 by a wireless protocol, the sources 350 can include their own power source or sources (not shown). More particularly, the controller 400 of the badge assembly 300 can be configured to control each of the LED sources 350, sets of the LED sources 350 or other combinations of the sources 350. For example, the controller 400 can include manual input, user-driven programming or other inputs (e.g., as manifested in software, hardware in the form of a printed circuit board (PCB), or the like) that can facilitate individual control of the LED sources 350 to direct incident light 355 into the badge member 310 and, ultimately, produce various visible iridescent patterns. In some embodiments, the controller 400 can adjust the power levels, timing and activation of each of the LED sources 350 to effect control over the incident light 355 and thereby control the visible, iridescent patterns produced by the badge assembly 300.

Variations and modifications can be made to the aforementioned structure without departing from the concepts of the present invention. For example, the principles of the disclosure can be employed to design and configure badges, trim and other similar assemblies for other non-vehicular structures that emanate visible iridescent patterns. For example, iridescent trim assemblies can be configured as holiday ornaments that produce visible, iridescent patterns in both ambient light and under night-time conditions with all of the benefits of the limited power usage associated with LED sources. Such variations and modifications, and other embodiments understood by those with skill in the field within the scope of the disclosure, are intended to be covered by the following claims unless these claims by their language expressly state otherwise.

What is claimed is:

1. A badge assembly, comprising:
a translucent, polymeric badge comprising an edge and an integral diffraction grating having a thickness from 500 nm to 750 nm and a period from 150 nm to 400 nm; and
LED sources oriented toward the edge,
wherein the grating diffracts light from the LED sources through the badge as a visible iridescent pattern, and
further wherein the badge comprises glass fillers in the range of 1 to 15% by volume.

2. The badge assembly according to claim 1, wherein the badge comprises a plurality of edges and each of the LED sources is oriented toward at least one of the edges.

3. The badge assembly according to claim 1, wherein the LED sources are coupled to a controller, the controller configured to individually control each of the LED sources.

4. The badge assembly according to claim 1, wherein the badge further comprises an interior surface, the interior surface comprising the diffraction grating.

5. The badge assembly according to claim 1, wherein the grating diffracts ambient light as a second visible iridescent pattern.

6. A badge assembly, comprising:
a translucent, polymeric badge comprising an edge and a film on an interior surface; and
LED sources oriented toward the edge,
wherein the film comprises a diffraction grating having a thickness from 500 nm to 750 nm and a period from 150 nm to 400 nm that diffracts light from the LED sources through the badge as a visible iridescent pattern, and
further wherein the badge comprises glass fillers in the range of 1 to 15% by volume.

7. The badge assembly according to claim 6, wherein the badge comprises a plurality of edges and each of the LED sources is oriented toward at least one of the edges.

8. The badge assembly according to claim 6, wherein the LED sources are coupled to a controller, the controller configured to individually control each of the LED sources.

9. The badge assembly according to claim 6, wherein the badge has a composition selected from the group consisting of silicones, acrylics and polycarbonates.

10. The badge assembly according to claim 6, wherein the film is formed by embossing, and the film is joined to the badge by insert molding.

11. The badge assembly according to claim 6, wherein the film is formed by embossing, and the film is joined to the badge with an optical adhesive.

12. The badge assembly according to claim 6, wherein the LED sources are located such that they are obscured by the badge.

13. The badge assembly according to claim 6, wherein the grating diffracts ambient light as a second visible iridescent pattern.

14. A badge assembly, comprising:
a translucent, polymeric badge comprising an edge and an interior surface with an integral diffraction grating having a thickness from 500 nm to 750 nm and a period from 150 nm to 400 nm;
LED sources oriented toward the edge; and
fascia configured to obscure the sources,
wherein the diffraction grating diffracts light from the LED sources through the badge as a visible iridescent pattern, and
further wherein the badge comprises glass fillers in the range of 1 to 15% by volume.

15. The badge assembly according to claim 14, wherein the badge comprises a plurality of edges and each of the LED sources is oriented toward at least one of the edges.

16. The badge assembly according to claim 14, wherein the LED sources are coupled to a controller, the controller configured to individually control each of the LED sources.

17. The badge assembly according to claim 14, wherein the badge has a composition selected from the group consisting of silicones, acrylics and polycarbonates.

18. The badge assembly according to claim 14, wherein the grating diffracts ambient light as a second visible iridescent pattern.

* * * * *